J. HARRIS, dec'd,
THE BALTIMORE CAR WHEEL COMPANY, assignee by mesne assignments.
CAR AXLE BOX.
No. 9,881. Reissued Sept. 27, 1881.
Fig. 1,
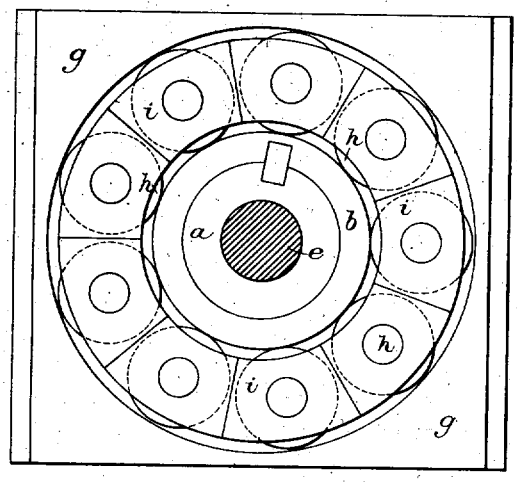
Fig. 2,
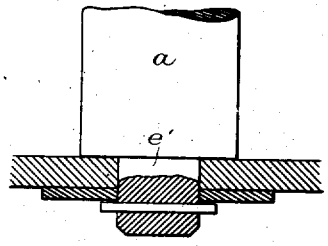
Fig. 4,
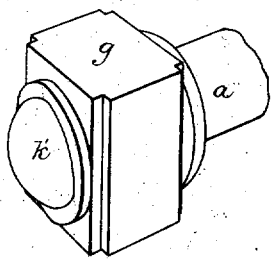
Fig. 3,
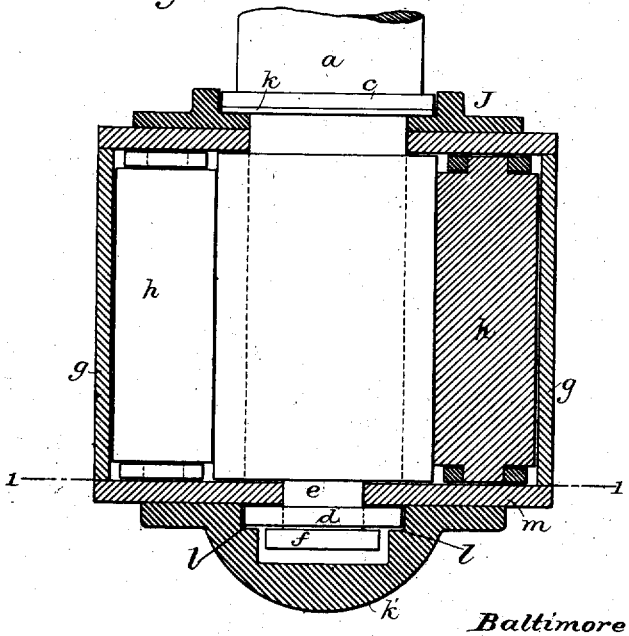
Fig. 5,
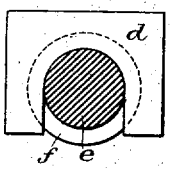
WITNESSES
Wm A Skinkle
Geo W. Beck.
Baltimore Car Wheel Company
Assignee of INVENTOR
Joseph Harris,
By its Attorneys
Baldwin, Hopkins, & Peyton.

UNITED STATES PATENT OFFICE.

THE BALTIMORE CAR WHEEL COMPANY OF BALTIMORE CITY, OF BALTIMORE, MD., ASSIGNEE, BY MESNE ASSIGNMENTS, OF JOSEPH HARRIS, DECEASED.

CAR-AXLE BOX.

SPECIFICATION forming part of Reissued Letters Patent No. 9,881, dated September 27, 1881.

Original No. 71,873, dated December 10, 1867. Application for reissue filed August 30, 1881.

*To all whom it may concern:*

Be it known that JOSEPH HARRIS, deceased, of Dorchester, in the county of Norfolk and State of Massachusetts, during his life-time invented certain new and useful Improvements in Car-Axle Boxes; and I do hereby declare that the following is a full and exact description thereof, reference being had to the accompanying drawings, and to the letters of reference marked thereon.

In the drawings, Figure 1 is a sectional view, the section cutting the axle transversely on the line 1 1 of Fig. 3. Fig. 3 is a vertical longitudinal sectional view, the section-plane cutting through the center of the axle. Fig. 4 is an external perspective view of the box complete, showing a portion of the axle broken away in the rear. Fig. 5 is a sectional view of the neck of the axle, showing in elevation the removable exterior shoulder which takes the thrust of the box. Fig. 2 is a view of one of many modifications which may be made of the exterior shoulder and means for holding it.

Like letters refer to the same or corresponding parts in all the views.

The car-axle *a* is furnished with the supplemental or exterior journal, *b*, within the box or case, and a shoulder, *c*, outside of the box and the removable shoulder *d* at the opposite end. The journal or end of the axle is necked down at *e* to receive the removable collar or shoulder *d*, leaving the fast shoulder *f* as a support or back for shoulder *d*. The axle-box case *g* is fitted to play in the usual jaws, or otherwise connected to the car or truck frame, and has a circular chamber. (See Fig. 1.) This circular chamber incloses a series of rollers, *h*. The rollers *h* have journals upon their ends, and to these journals is fitted a series of boxes or guides, *i*. These guides *i* have faces which are radial to the axle, and the boxes or guides are of such length as to keep the peripheries of the rolls from contact with each other, they (the guides) bearing against each other's radial faces, where they form a series of radial detached joints. The axle extends entirely through the box or case *g* by its necked portion *e*. The exterior or supplemental journal, *b*, bears on the series of rolls within, while they, in turn, bear without on the inner surface of the circular chamber. The supplemental journal *b* may be loose on the journal, but had better be fast, so as to insure its turning with the axle and not upon it. A recess is formed in a seat, J, and a washer, *k*, is interposed between it and the shoulder *c*. The shoulder *d* is open on the side, as shown in Fig. 5, so that it can be applied by slipping onto the neck *e* inside of the shoulder *f*. A casing, *k'*, covers it and the end of the axle. This casing is firmly secured to the outer end of the box, covering the end of the axle, and practically forming part of the box. A recess, *l*, in this cap forms, in connection with the plate *m*, a socket opposite the neck or annular recess *e* in the axle. The shoulder or key *d* straddles the neck and fits into the socket so as to take the outer end-thrust of the box and key it and the axle together. The inner end-thrust of the box comes upon shoulder *c*, the washer *k*, and seat J.

The parts may be made of such materials as are usually employed in the art.

Having described the improvement of said JOSEPH HARRIS, deceased, what is claimed as his invention, and desired to be secured by Letters Patent, is as follows:

1. The guide-rollers *i*, with detached radial joints, substantially as described.

2. In combination with the system of rollers and box *g*, the axle with its extension *e* and shoulder *d*, as and for the purpose specified.

3. The combination, with the neck or annular recess *e* in the journal, and with the journal-box, of the key or shoulder *d*, to slip on or straddle the journal in said recess, and extend upon each side of it to key the journal and box together, substantially as shown and described.

THE BALTIMORE CAR WHEEL COMPANY
OF BALTIMORE CITY,
By WM. S. G. BAKER,
*Prest.*

Witnesses:
J. M. LARFORD,
C. W. KOHLMAN.